(12) United States Patent
Houdeshell et al.

(10) Patent No.: US 8,616,869 B2
(45) Date of Patent: Dec. 31, 2013

(54) IN-MOLD LABELING APPARATUS AND METHOD

(75) Inventors: Thomas R. Houdeshell, Kerrville, TX (US); Bradley A. Atkins, Pipe Creek, TX (US)

(73) Assignee: Vention Medical, Inc., South Plainfield, NJ (US)

( * ) Notice: Subject to any disclaimer, the term of this patent is extended or adjusted under 35 U.S.C. 154(b) by 269 days.

(21) Appl. No.: 12/757,691

(22) Filed: Apr. 9, 2010

(65) Prior Publication Data

US 2011/0169192 A1    Jul. 14, 2011

Related U.S. Application Data

(60) Provisional application No. 61/293,912, filed on Jan. 11, 2010.

(51) Int. Cl.
*B28B 21/36* (2006.01)

(52) U.S. Cl.
USPC ......... 425/126.1; 425/504; 425/544; 425/546

(58) Field of Classification Search
USPC .............................. 425/504, 544, 546, 126.1
See application file for complete search history.

(56) References Cited

U.S. PATENT DOCUMENTS

| | | | |
|---|---|---|---|
| 3,324,508 A | 6/1967 | Dickinson | |
| 4,639,206 A * | 1/1987 | Darr | 425/503 |
| 4,639,207 A * | 1/1987 | Slat et al. | 425/503 |
| 4,686,076 A * | 8/1987 | Dromigny et al. | 264/268 |
| 4,802,295 A * | 2/1989 | Darr | 40/310 |
| 4,840,366 A | 6/1989 | Johnston et al. | |
| 4,954,070 A | 9/1990 | Dunlap | |
| 5,028,229 A | 7/1991 | Keyser | |
| 5,067,890 A | 11/1991 | Dunlap et al. | |
| 5,076,992 A | 12/1991 | Keyser | |
| 5,082,439 A | 1/1992 | Kaminski | |
| 5,104,306 A | 4/1992 | Gordon et al. | |
| 5,165,408 A * | 11/1992 | Tomoda | 600/401 |
| 5,169,653 A | 12/1992 | Tate et al. | |
| 5,192,554 A | 3/1993 | Savich | |
| 5,223,315 A | 6/1993 | Katsura et al. | |
| 5,230,502 A | 7/1993 | Plenzler et al. | |
| 5,254,302 A * | 10/1993 | Yamanaka | 264/129 |

(Continued)

FOREIGN PATENT DOCUMENTS

DE    19947139 A1    4/2000
DE    10 2004 026 207 A1    12/2005

(Continued)

OTHER PUBLICATIONS

European Search Report for Application No./Patent No. 10252211.7-2307/2343175, dated Nov. 11, 2012, 21 pages.

*Primary Examiner* — Amjad Abraham
(74) *Attorney, Agent, or Firm* — Barnes & Thornburg LLP

(57) ABSTRACT

An in-mold labeling apparatus for an injection-molded product includes a label magazine, a handling tool, an injection mold, and a controller. The injection mold has a suction port disposed in the mold cavity. A pin may be fixedly or movably disposed in the suction port. A method of in-mold labeling an injection-molded product includes applying a static charge to the label using the handling tool, activating the suction port in the mold cavity, deactivating a suction port of the handling tool, and activating the injection molding.

15 Claims, 12 Drawing Sheets

(56) References Cited

U.S. PATENT DOCUMENTS

| | | |
|---|---|---|
| 5,266,149 A | 11/1993 | Collette et al. |
| 5,344,305 A | 9/1994 | McKillip |
| 5,350,483 A | 9/1994 | Yager et al. |
| 5,368,798 A | 11/1994 | Mizukoshi et al. |
| 5,520,876 A | 5/1996 | Döbler |
| 5,526,365 A | 6/1996 | Whetsel |
| 5,551,860 A | 9/1996 | Budzynski et al. |
| 5,614,146 A | 3/1997 | Nakamura et al. |
| 5,665,404 A | 9/1997 | Weber et al. |
| 5,753,278 A * | 5/1998 | Aguilar ........................ 425/503 |
| 5,756,038 A | 5/1998 | Iseli et al. |
| 5,885,408 A | 3/1999 | Kaminski |
| 5,908,590 A | 6/1999 | Yoshimi et al. |
| 5,919,414 A | 7/1999 | Dobler |
| 5,919,498 A | 7/1999 | Weber et al. |
| 5,968,443 A | 10/1999 | Robles et al. |
| 6,153,143 A | 11/2000 | Condon |
| 6,205,743 B1 | 3/2001 | Castellari |
| 6,248,441 B1 | 6/2001 | Anderson et al. |
| 6,264,876 B1 | 7/2001 | Ballay |
| 6,454,988 B1 * | 9/2002 | Condon ........................ 264/509 |
| 6,544,634 B1 | 4/2003 | Abrams et al. |
| 6,569,276 B2 | 5/2003 | Anderson et al. |
| 6,641,876 B2 | 11/2003 | Amrine |
| 6,644,647 B2 | 11/2003 | Dunlap et al. |
| 6,649,119 B2 | 11/2003 | Dunlap et al. |
| 6,740,283 B2 | 5/2004 | Matsui et al. |
| 6,773,653 B2 | 8/2004 | Miller et al. |
| 6,858,283 B2 | 2/2005 | Nishizawa et al. |
| 6,990,723 B1 | 1/2006 | Hoogland |
| 7,005,094 B2 | 2/2006 | Jack |
| 7,128,564 B2 | 10/2006 | Di Simone |
| 7,166,249 B2 | 1/2007 | Abrams et al. |
| 7,291,305 B2 | 11/2007 | Vanderploeg et al. |
| 7,302,995 B2 | 12/2007 | Alberts |
| 7,351,050 B2 | 4/2008 | Vanderploeg et al. |
| 7,369,048 B2 | 5/2008 | Freund |
| 7,387,698 B2 | 6/2008 | Hoogland |
| 7,407,618 B2 | 8/2008 | Vanderploeg et al. |
| 7,628,597 B2 | 12/2009 | Teensma et al. |
| 2004/0026438 A1 | 2/2004 | Tyra et al. |
| 2004/0084809 A1 | 5/2004 | Vanderploeg et al. |
| 2004/0115376 A1 | 6/2004 | Tomczyk |
| 2004/0238547 A1 | 12/2004 | Tyra et al. |
| 2005/0008809 A1 | 1/2005 | Miller et al. |
| 2006/0070704 A1 | 4/2006 | Sinclair et al. |
| 2006/0163779 A1 | 7/2006 | Zimmerman |
| 2006/0231199 A1 | 10/2006 | Weng et al. |
| 2007/0042144 A1 * | 2/2007 | Teensma et al. ............ 428/34.2 |
| 2007/0079928 A1 | 4/2007 | Abrams et al. |
| 2007/0098838 A1 | 5/2007 | Dobler |
| 2007/0257398 A1 | 11/2007 | Moncrieff |
| 2008/0063835 A1 * | 3/2008 | Iwasa et al. ................ 428/137 |
| 2008/0088068 A1 | 4/2008 | Alberts |
| 2008/0113093 A1 | 5/2008 | Hanney |
| 2008/0143017 A1 | 6/2008 | Hoogland |
| 2008/0148948 A1 | 6/2008 | Evers et al. |
| 2008/0173405 A1 | 7/2008 | Freund |
| 2008/0206510 A1 | 8/2008 | Huang |
| 2008/0286506 A1 | 11/2008 | Kennedy |
| 2009/0065974 A1 | 3/2009 | Huang |
| 2009/0101554 A1 | 4/2009 | Kreiner et al. |
| 2009/0134229 A1 | 5/2009 | Huang |
| 2009/0160087 A1 | 6/2009 | Yang |
| 2009/0237215 A1 | 9/2009 | Dunlap et al. |
| 2010/0001010 A1 | 1/2010 | Motegi et al. |
| 2010/0047496 A1 | 2/2010 | Teensma et al. |
| 2010/0052215 A1 | 3/2010 | Emond et al. |

FOREIGN PATENT DOCUMENTS

| | | | |
|---|---|---|---|
| EP | 0 423 405 A1 | 4/1991 | |
| GB | 2 185 709 A | 7/1987 | |
| GB | 2185709 A * | 7/1987 | ............ B29C 45/14 |
| GB | 2 415 406 A | 12/2005 | |
| JP | 7-276425 | 10/1995 | |
| JP | 9220759 A | 8/1997 | |
| JP | 11-34154 | 2/1999 | |
| JP | 2000109035 A * | 4/2000 | ............ B65C 9/12 |
| JP | 2002-154152 | 5/2002 | |
| JP | 2009-078410 | 4/2009 | |
| WO | WO 03/020246 A1 | 3/2003 | |
| WO | WO2009012313 A1 | 1/2009 | |
| WO | WO 2009065445 A1 * | 5/2009 | ............ B32B 27/10 |
| WO | WO 2011/057662 A1 | 5/2011 | |

* cited by examiner

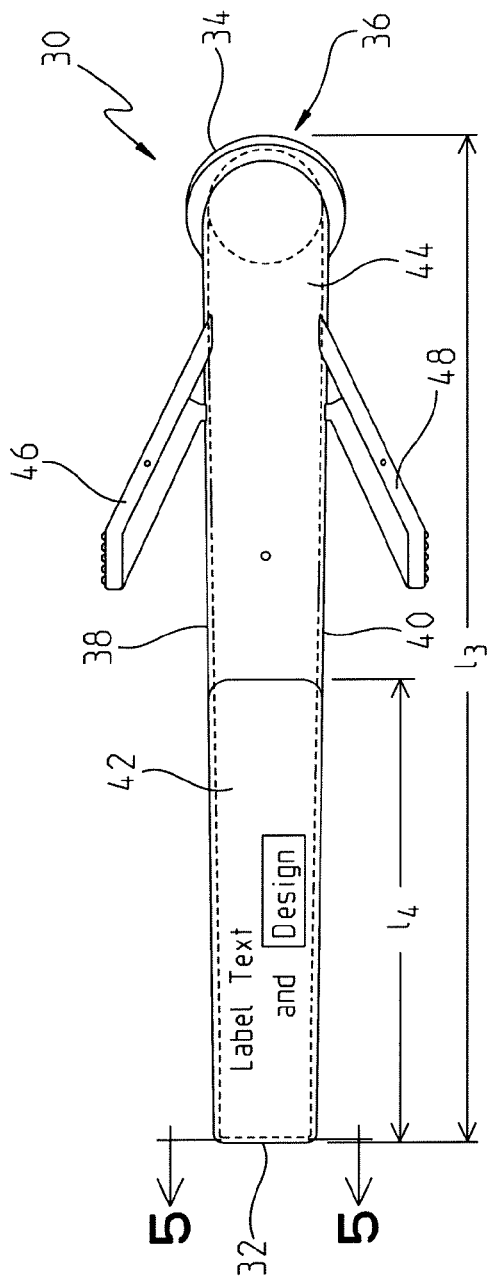
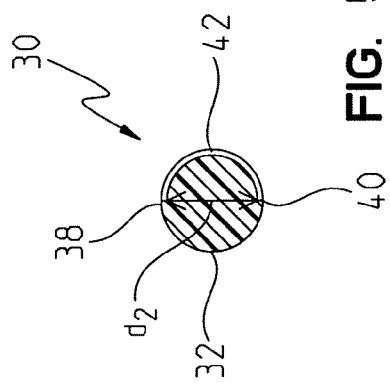
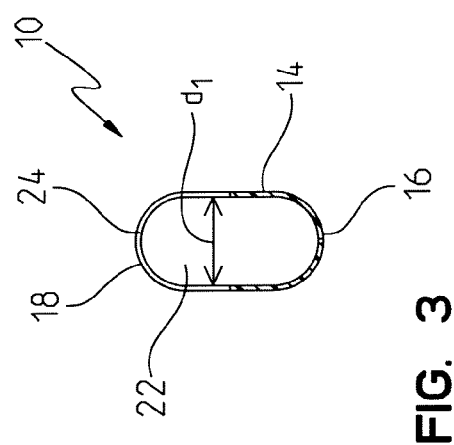
FIG. 4
FIG. 5
FIG. 3

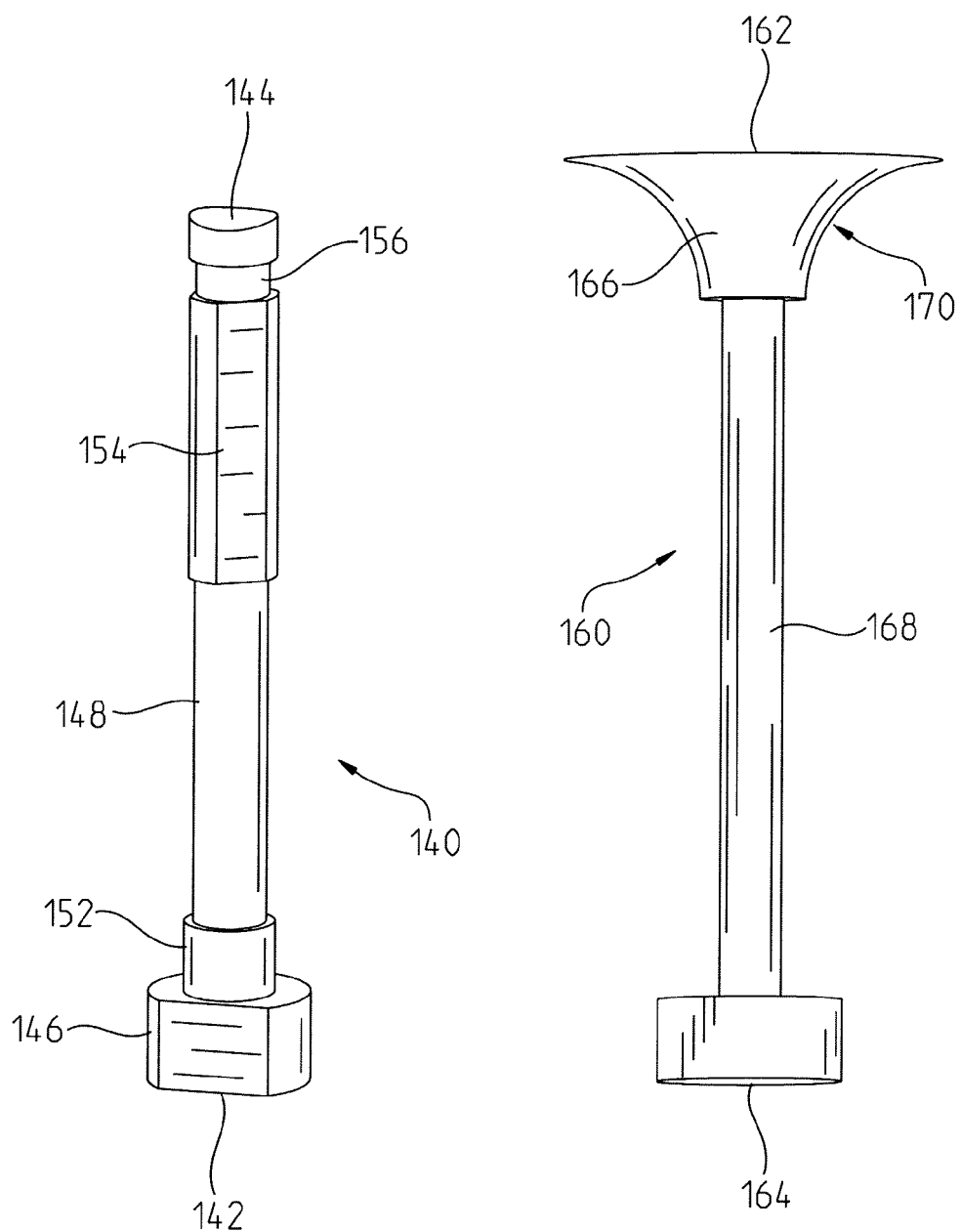

IN-MOLD LABELING APPARATUS AND METHOD

RELATED APPLICATIONS

This application claims the benefit of U.S. Provisional Patent Application Ser. No. 61/293,912, filed Jan. 11, 2010, which is incorporated herein by this reference in its entirety.

TECHNICAL FIELD

The present disclosure relates generally to methods and apparatus for in-mold labeling of injection-molded products.

BACKGROUND

Injection molding is a process for producing manufactured products from a resin material, such as a thermoplastic or thermosetting plastic material. After the product is designed, a mold is created, usually from a metal such as steel or aluminum. The mold is precision-machined to form the features of the product. To create the product, the resin material is heated and forced by injection into the mold cavity, where it cools and conforms to the configuration of the mold cavity.

Typically, an injection-molding machine includes a hopper in which the resin material is stored in a granular form. The resin material is heated and fed into the mold via one or more feed lines. The heated resin material is forced into the mold cavity by a ram, plunger, reciprocating screw, or other type of injector.

In-mold labeling is a process by which a product's label is secured to the product during the molding process, so that the label becomes an integral part of the product. During the in-mold labeling process, tooling transfers the label to the mold and aligns it in the mold cavity prior to the introduction of the resin material.

SUMMARY

According to one aspect of this disclosure, an automated method for in-mold labeling an injection-molded product includes holding a label using a computer-controlled handling tool, placing the label into the mold cavity using the handling tool, locating the label in the target area using the handling tool, retaining the label in the target area by activating a suction port in the mold cavity, deactivating a suction port of the handling tool, supporting the label with a pin disposed in the suction port while the suction port is activated, and injecting a molding material into the mold cavity to create the injection-molded product. The product has a corresponding mold cavity. The mold cavity has a target area for location of a label thereon. At least a portion of the target area has a semi-circular cross-section.

The holding step may include activating the suction port of the handling tool. The placing step may include applying a static charge to the label using the handling tool. The moldable material may be a plastic suitable for a medical application. The target area may have a diameter in the range of about 0.5 inches. The injection-molded product may be a medical product.

According to another aspect of this disclosure, an apparatus for in-mold labeling an injection-molded product includes a label magazine comprising more than four label storage stations, a handling tool configured to handle more than four labels simultaneously, and a mold having more than four mold cavities, wherein the handling tool is configured to simultaneously remove more than four labels from the magazine, and to simultaneously position each of the labels in one of the mold cavities.

In the apparatus, each label storage station of the label magazine may have a perimeter, where a number of vertically extending bars are disposed around the perimeter of the label storage station to define a label stacking column. At least one of the vertically extending bars may be axially rotatable, while another of the vertically extending bars is non-rotatable.

Each label storage station may include a label dispensing aperture and a tab extending at least partially into the label dispensing area. The tab may have an upwardly facing rounded surface configured to at least temporarily engage a surface of a label. The position of the tab may be adjustable relative to the label dispensing aperture. The apparatus may have a sensing device coupled to the label dispensing aperture.

According to a further aspect of this disclosure, an apparatus for in-mold labeling an injection-molded product includes a label magazine comprising a plurality of label storage stations, a handling tool configured to handle a plurality of labels simultaneously, and a mold having a plurality of mold cavities, where the handling tool is configured to simultaneously remove multiple labels from the magazine, and to simultaneously position each of the removed labels in a tightly contoured target area of one of the mold cavities.

In the apparatus, each target area may have a suction port disposed therein. Each suction port may have a pin disposed therein. The pin may have a first position in which the suction port is open and a second position in which the suction port is closed. A head of the pin may support the label when the pin is in the second position. The head of the pin may be at least partially in the mold cavity when the pin is in the first position. A body portion of the pin may have a generally triangular cross section.

The target area may have a textured surface. The apparatus may have a plurality of tracks in the target area and intersecting the suction port.

Patentable subject matter may include one or more features or combinations of features shown or described in this disclosure including the written description, drawings, and claims.

BRIEF DESCRIPTION OF THE DRAWINGS

The detailed description refers to the following figures in which:

FIG. 3 is a sectional view of an end of the product of FIGS. 1 and 2;

FIG. 4 is a schematic side view of another product suitable for in-mold labeling using the disclosed apparatus and method;

FIG. 5 is a sectional view of an end of the product of FIG. 4;

FIG. 12A is a perspective view of a pin that may be used in the suction port of the mold cavity;

FIG. 13 is another example of a pin that may be used in a suction port of the mold cavity;

In the drawings, like reference numerals refer to corresponding parts in the several views. To facilitate explanation, elements shown in the figures are not necessarily drawn to scale and may or may not be drawn in proportionate size to one another.

DETAILED DESCRIPTION

Figure 1:
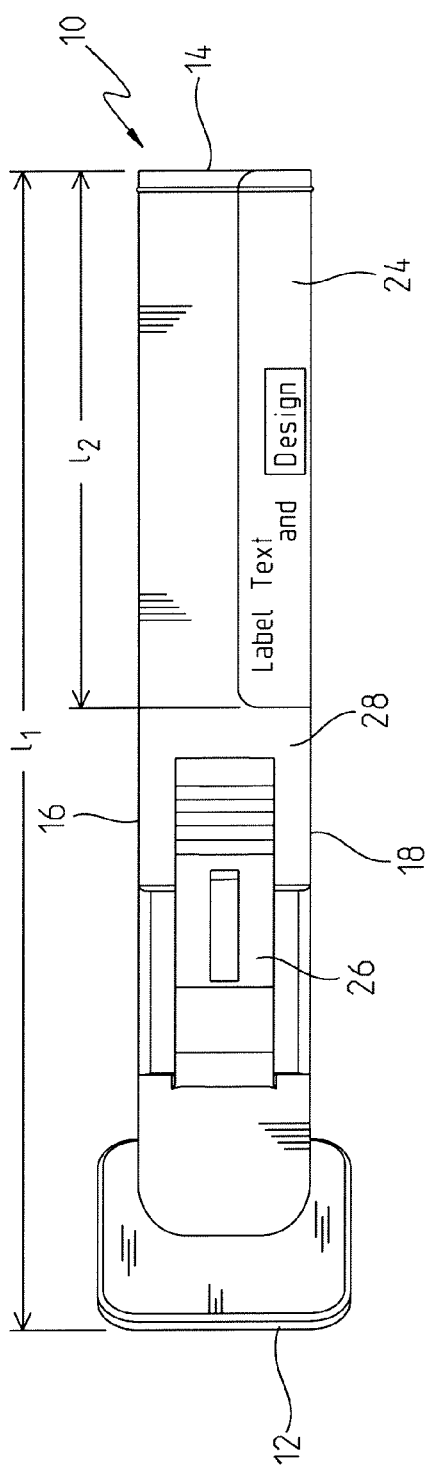
FIG. 1 is a schematic view of one side of a product suitable for in-mold labeling using the disclosed apparatus and method.

While the concepts of the present disclosure are susceptible to various modifications and alternative forms, specific exemplary embodiments thereof are shown by way of example in the drawings and are described in detail herein. It should be understood, however, that there is no intent to limit the concepts of the present disclosure to the particular forms that are expressly disclosed, but on the contrary, the intention is to cover all modifications, equivalents, and alternatives falling within the spirit and scope of the present invention as defined by the appended claims.

There are a wide variety of products that are made today by injection molding, from plastic containers to automobile body panels. More recently, injection molding processes have been successfully used to create smaller-scale products and products that have small-radius or "tight" contours. Some products having these characteristics are used in the medical industry, as well as in other industries. For example, some medical applicators used to prepare a patient for surgery have small-radius contours. Some of these products can now be injection-molded. However, there are difficult challenges that have traditionally prevented the use of in-mold labeling to label these injection-molded products.

This disclosure illustrates some injection-molded products that can be in-mold labeled using the methods and apparatus described herein. The apparatus and methods for in-mold labeling injection-molded products described herein may be useful for in-mold labeling injection-molded products that have small-radius contours, as well as for products that have larger-radius contours or other configurations. For example, the apparatus and methods described herein may be used to in-mold label injection-molded products that have a diameter in the range of about 0.25 inches up to about one inch, and may also be used to in-mold label products that have larger diameters.

Figure 2:
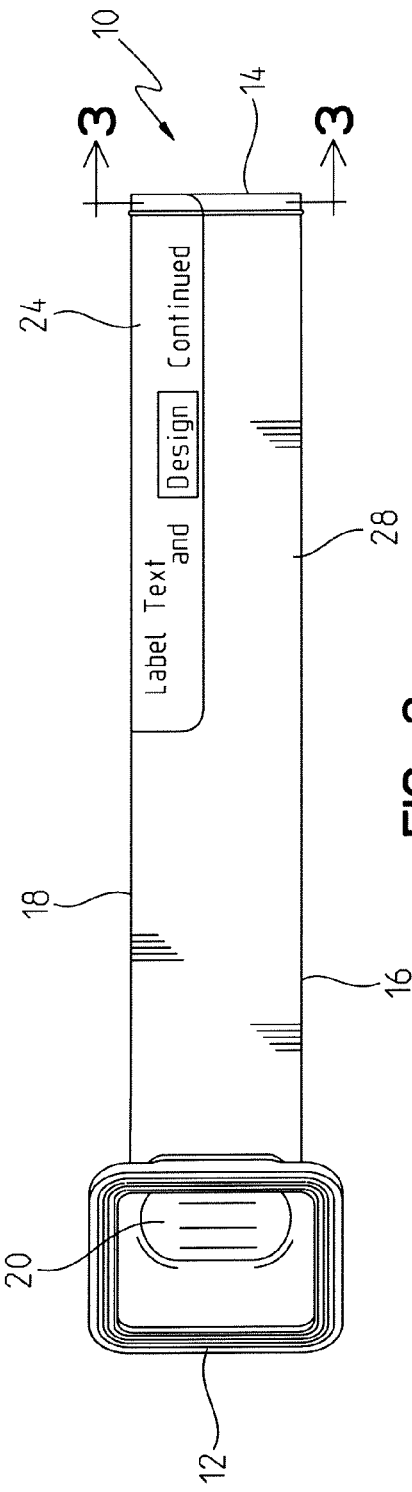
FIG. 2 is a schematic view of another side of the product of FIG. 1, which is opposite the side shown in FIG. 1.

FIGS. 1-5 illustrate two examples of injection-molded products that have small-radius contours. In FIGS. 1-3, a medical applicator 10 having a generally tubular structure with two open ends is shown. The applicator 10 has an outer surface 28, an end 12, an end 14 longitudinally spaced from the end 12, a side 16, and another side 18 laterally spaced from the side 16. The applicator 10 has an opening 20 at the end 12 and an opening 22 at the end 14, which connect within the applicator 10 to define a hollow interior region. The applicator 10 also has a contoured flange 26, which extends outwardly away from the outer surface 28, as shown in FIG. A8 of U.S. Provisional Patent Application Ser. No. 61/293,912. FIG. A5 of U.S. Provisional Patent Application Ser. No. 61/293,912 is a picture that shows a portion of a mold cavity for the applicator 10, including a mold portion for the flange 26.

After completion of an in-mold labeling process such as described herein, a label 24 is integral with the contoured outer surface 28 of the applicator 10. Prior to in-mold labeling, the label has an elongated rectangular shape. The length, $l_2$, of the label 24 is greater than its width. After in-mold labeling, the width of the label 24 follows the contour of the applicator 10 as shown in FIG. 3.

Figure 14:
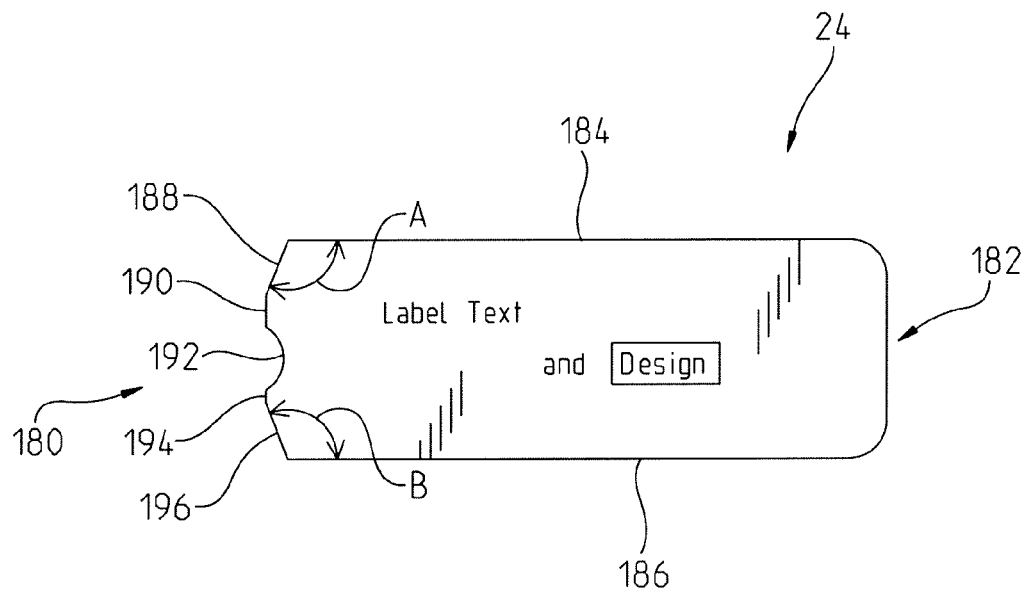
FIG. 14 is one example of a label that may be used in the in-mold labeling method described herein.

One version of the label 24 is shown in FIG. 14. The illustrated label 24 has an end 180, another end 182, which is longitudinally spaced from the end 180, a side 184, and a side 186, which is laterally spaced from the side 184 to form a generally rectangular shape. Prior to in-mold labeling, the end 180 of the label 24 is aligned with an end of the mold that corresponds to an open end of the applicator 10. In the illustrated embodiment, the end 180 of the label 24 is integral with the open end 14 of the applicator 10 after in-mold labeling.

The end 180 is chamfered to allow the label to absorb the impact of injection flow without causing wrinkling of the label (or otherwise deforming or compromising the integrity of the label) or shifting of the label's position, or for other reasons.

In particular, the end 180 has a pair of angled surfaces 188, 196, an indented or "cutout" area 192, and a pair of straight surfaces 190, 194. In the illustrated example, the area 192 is semicircular in shape and the surface 190 is longer in length than the surface 194.

The surfaces 188, 196 lie in separate planes that intersect at an angle that is greater than ninety degrees. The surface 188 intersects the side 184 at an angle C, which is greater than ninety degrees. The angle A between the surface 188 and the side 184 is greater than ninety degrees, such that the complementary angle is less than ninety degrees. Similarly, the surface 196 intersects the side 186 at an angle B, which is greater than ninety degrees, such that the complementary angle is less than ninety degrees. In the illustrated version of the label, the angles A and B (and therefore, the complementary angles) are equal or about equal. In some versions of the label 24, the angles A and B are each in the range of about 110 to 120 degrees. In one version of the label 24, the angles A and B are each in the range of about 112 degrees, such that their complementary angles are each in the range of about 68 degrees.

Figure 15:
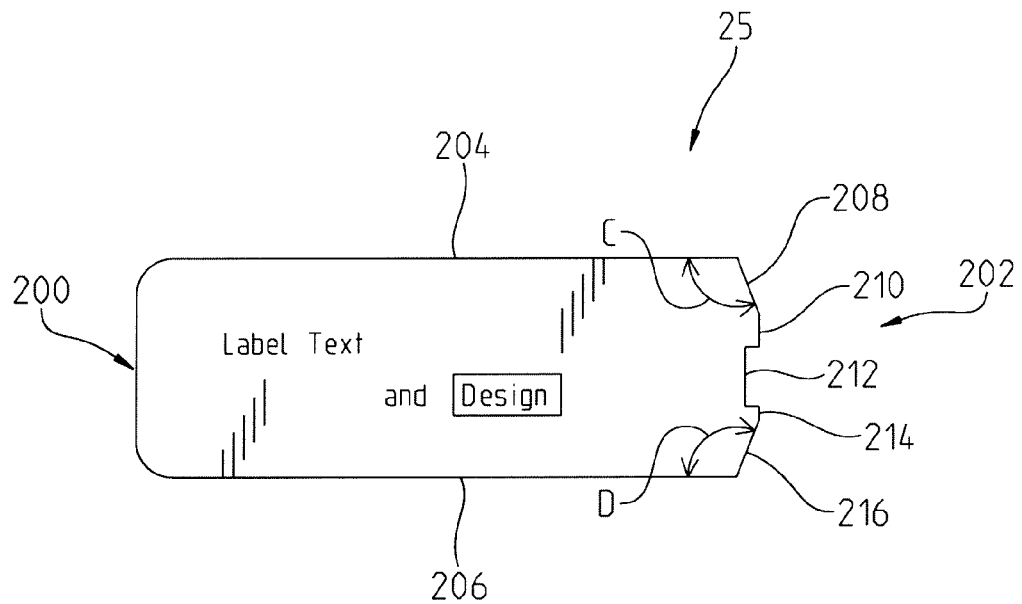
FIG. 15 is another example of a label that may be used in the in-mold labeling method described herein.

Another version of a label that may be used with the applicator 10 is shown in FIG. 15. The label 25 is similar to the label 24 in many respects, except that the chamfer is on the opposite end of the label. The label 25 has two opposing sides 204, 206 and two opposing ends 200, 202. The end 202 is chamfered such that the size of the angles C and D are in the same range as the angles A and B of the label 24. The end 202 has two angled surfaces 208, 216 joined by two straight surfaces 210, 214 and a cutout region 212. In the illustrated embodiment, the cutout region 212 is rectangularly shaped, although this need not be the case.

Prior to in-mold labeling, the end 202 of the label 25 is aligned with an end of the mold that corresponds to an open end of the product. After in-mold labeling, the end 202 of the label 25 is integral with an end of the molded product (e.g., an open end of the product).

The chamfered labels 24, 25 may be used with open-ended devices such as the applicator 10, and may also be used with closed-ended devices such as the applicator 30 shown in FIG. 4 and described below.

As illustrated in FIG. 1, the length $l_1$ of the applicator 10 is longer than the length $l_2$ of the label 24, although in other products that can be made according to the disclosed process, the length of the label may be coextensive with the length of the product. In the illustrations, the length $l_2$ of the label 24 is about 50% of the length $l_1$ of the applicator 10, although in other products, the ratio of the length $l_2$ to the length $l_1$ may vary from that illustrated herein.

The end 14 of the applicator 10 with which the label 24 is integrated has an oblong cross-section, as shown in FIG. 3. Other products may have a circular, semi-circular, elliptical, rectangular, or other suitable cross-sectional shape. It is also possible for the label to be placed away from the end 14 of the product, i.e., more toward the middle of the applicator 10, or toward the opposite end 12 of the applicator 10, as a particular product design may require. In the illustrated product, the width-wise distance, $d_1$, across the end 14 of the applicator 10 defines the contour that the label 24 must follow. In the illustrated applicator 10, the distance $d_1$ is in the range of about 0.5 inches, although other designs may require a smaller or larger distance $d_1$. While the illustrations show labels that only wrap partially around the contour of the illustrated products, it is also possible to use the disclosed apparatus and process to in-mold labels that wrap fully around the contour of a given product (i.e., so that one longitudinal side of the label abuts the other longitudinal side).

Another applicator 30 is shown in FIGS. 4-5. The applicator 30 has a closed end 32 and an open end 34, a side 38, and another side 40 laterally spaced from the side 40. The applicator 30 is a test tube-like structure with an opening 36 extending into an interior region of the applicator 30. The applicator 30 has an outer surface 44. The applicator 30 also has a pair of outwardly extending flanges 46, 48 as shown in FIG. 4. A label 42 is fixed to the applicator 30 by an in-mold labeling apparatus and method such as disclosed herein.

Prior to in-mold labeling, the label 42 has an elongated rectangular shape. The length, $l_4$, of the label 42 is greater than its width. After in-mold labeling, the width of the label 42 follows the contour of the closed end 32 of the applicator 30 as shown in FIG. 5. Prior to in-mold labeling, one end of the label 42 is aligned with the end of the mold that corresponds to the closed end 32 of the applicator 30. In one version, the end of the label 42 that is aligned with the closed end 32 is not chamfered. However, in other versions, the label 42 may be chamfered.

After completion of the in-mold labeling process described herein, the label 42 is integral with the contoured outer surface 44 of the applicator 30. In the illustrated version, one end of the label 42 is adjacent to the end 32 of the applicator 30 after the in-mold labeling is complete.

As illustrated, the length $l_3$ of the applicator 30 is longer than the length $l_4$ of the label 42, although in other products that can be made according to the disclosed process, the length of the label may be coextensive with the length of the product. In the illustrations, the length $l_4$ of the label 24 is about 50% of the length $l_3$ of the applicator 30, although in other products, the ratio of the length $l_4$ to the length $l_3$ may vary from that illustrated herein.

The end 32 of the applicator 30 with which the label 42 is aligned has a circular cross section, as shown in FIG. 5. Other products may have an oblong, elliptical, rectangular, semi-circular or other suitable cross-sectional shape. The distance $d_2$ across the end 32 of the applicator 30 (or diameter, in the case of a circular cross section), defines the contour that the label 42 must follow. In the illustrated applicator 30, the distance $d_2$ is in the range of about 0.5 inches although other designs may require a smaller or larger distance $d_2$.

The applicators 10, 30 are injection-molded using a resin (e.g. plastic) material that is suitable for medical and/or surgical applications. Other types of injection-molded products that may be in-mold labeled according to the techniques disclosed herein include, for example, test tubes, pins, vials, and syringes. The disclosed processes may also be applied to in-mold labeling of other, e.g. non-medical, products.

The labels 24, 25, 42 are made of a polymer material and generally have a thickness in the range of about 0.001 inches to about 0.010 inches. Some versions of the labels 24, 25, 42 have a thickness in the range of about 0.002 to about 0.006 inches. In one version, the label thickness is about 0.005 inches.

The labels 24, 25, 42 each have an outer surface (shown in the figures), which is pre-printed with text and/or graphical designs. Multiple colors may be used in the pre-printing of the labels. The printed surface may have a protective coating configured to protect the printing from exposure to solvents (e.g. at the time of product use), or for other reasons.

The labels 24, 25, 42 also have a contact surface (not shown) opposite the printed surface, which interfaces with the outer surface of the product (e.g. surfaces 28, 44). The contact surface may have an adhesive layer, although this is not required. One end of the labels 24, 25, 42 may have an angled (e.g. chamfered) cut, as described above. In the illustrations, the approximate dimensions of the labels 24, 25, 42 are in the range of about 4.125 inches long by about 1.25 inches wide, although labels having different dimensions may be used, in accordance with the requirements of a particular product design.

Figure 6:
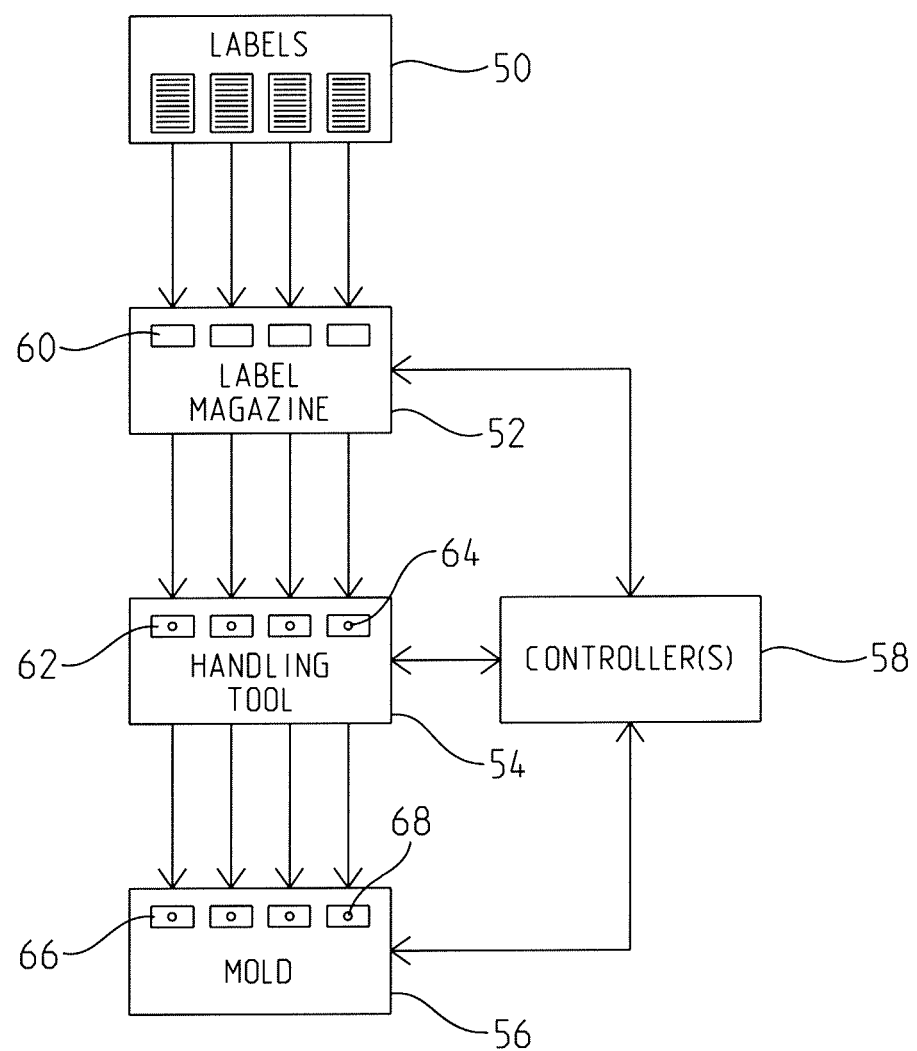
FIG. 6 is a simplified schematic depicting an in-mold labeling apparatus and method in accordance with this disclosure.

FIG. 6 schematically illustrates the automated in-mold labeling process described herein and structural components that are involved in performing the process. The disclosed process uses a label magazine 52, which facilitates higher cavitation applications in which multiple products are in-mold labeled simultaneously. A number of stacks of labels 50 are loaded into each label storage location 60 in the label magazine 52. The loading of labels 50 into the label magazine 52 may be done manually or may be automated with use of a label loading apparatus (not shown). The label magazine 52 is described in more detail below with reference to FIGS. 7-10. An example of a label magazine loaded with multiple columns of labels is shown in FIG. A1 of U.S. Provisional Patent Application Ser. No. 61/293,912.

Using robotic action (e.g. a robotic arm, not shown), a handling tool 54 is positioned adjacent the label magazine 52. The handling tool 54 simultaneously draws a label from each label storage location 60 of the label magazine 52, and holds it at a corresponding label handling station 62 of the handling tool 54. Each label handling station 62 has a suction port 64, which creates a reduction in air pressure or vacuum to retain the label at its respective label handling station 62 of the handling tool 54. A picture of a label handler in position to draw labels from the bottom of a label magazine is shown in FIG. A2 of U.S. Provisional Patent Application Ser. No. 61/293,912.

Using robotic action, the handling tool 54 transports the labels to a mold 56, which contains a number of mold cavities 66, each of which has previously been machined to create one instance of the desired product (e.g. the applicator 10, the applicator 30, or some other product) by injection molding. As illustrated, the number of mold cavities typically corresponds to the number of labels being handled simultaneously. For example, the number of mold cavities is the same as the number of label handling stations 62 in the handling tool 54, which is the same as the number of label storage locations 60 in the label magazine 52. A picture of a label handler holding labels in transit from a label magazine to the mold is shown in FIG. A3 of U.S. Provisional Patent Application Ser. No. 61/293,912.

Once at the mold, the handling tool 54 positions itself to properly align each label with its corresponding mold cavity 66 and place the individual labels in their respective mold cavities simultaneously. The handling tool 54 is configured to locate a particular target area 130 (e.g. FIG. 11) within each mold cavity 66, at which the label is to be placed. Each mold cavity 66 has a suction port 68, which creates a reduction in air pressure or vacuum to retain the label at its respective target area 130 within the mold cavity 66. When the handling tool 54 places the label in the mold cavity 66, the suction port 68 is activated. A picture of a label handler placing labels in the mold is shown in FIG. A4 of U.S. Provisional Patent Application Ser. No. 61/293,912.

Also, a static charge is deposited on each of the labels by individual pinners (not shown) located on the handling tool 54. The activation of the suction port 68 and the depositing of the static charge may be performed simultaneously or sequentially as may be suitable or desired for a particular product design. The static charge is used to attract the label to the surface of the mold cavity 66. To enhance the effectiveness of the static charge, or for other reasons, an insulating material (e.g. foam) may be placed behind the suction port 64 of the handling tool 54. The insulating material may be contoured to follow the shape and configuration of the mold cavity 66. The contoured shape of the insulating material may be used to force the label into full contact with the surface of the mold cavity during placement of the label in the mold cavity. A picture of a mold cavity with a suction port therein is shown in FIG. A5 of U.S. Provisional Patent Application Ser. No. 61/293,912. Additional aspects of the mold cavity are described below with reference to FIGS. 11-13.

To accomplish the transition of the label from the handling tool 54 to the target area 130, the suction port 64 of the handling tool 54 is deactivated. The deactivation of the suction port 64 may occur simultaneously with the activation of the suction port 68 and/or the activation of the static charge, or shortly thereafter.

Once the labels are properly placed in their respective mold cavities, the resin material is injected into the mold. When the injection molding process is complete, the handling tool 54 removes the molded and labeled products from the mold and transports them to collection bins. A picture of a handling tool removing products from the mold cavities is shown in FIG. A7 of U.S. Provisional Patent Application Ser. No. 61/293,912. A picture of a handling tool transporting products to a collection bin is shown in FIG. A8 of U.S. Provisional Patent Application Ser. No. 61/293,912. Each completed product is evaluated for conditions that may cause the product to be rejected. The evaluation typically includes automated processes, which may include a vision system, in-mold pressure sensors, or other mechanisms for evaluating the product.

A controller or controllers 58 controls the various aspects of the in-mold labeling process described above. The controller(s) 58 include computer processors (e.g. microprocessors), electrical circuitry, computer memory, and computerized instructions stored in the computer memory, for receiving electrical signals from the various components of the above-described in-mold labeling apparatus (e.g. sensing devices such as pressure sensors, proximity sensors, temperature sensors, humidity sensors and the like), processing the signals according to programmed computer logic, and sending control signals to one or more of the components of the in-mold labeling apparatus (e.g., the label magazine, label handler, vision system, and/or suction ports). A communication network may be used to enable data communication among the various components of the in-mold labeling apparatus.

Aspects of the label magazine 52 are shown in FIGS. 7-10. The illustrated label magazine has a top plate 70, and a bottom plate 72 vertically spaced from the top plate 70 by a number of supports 74, 76, 77, 78, 80. The label magazine 52 is configured for simultaneous dispensing of eight labels from the bottom plate 72. However, the label magazine 52 can be configured for smaller or higher cavitation applications as may be needed. In some versions, the label magazine 52 is configured for simultaneous dispensing of labels for molds having more than four up to sixteen or more mold cavities. In other versions, the label magazine 52 is configured for molds having less than four mold cavities. The label magazine 52 has one label storage station 60 for each of the mold cavities in the mold for which it supplies labels.

Figure 7:
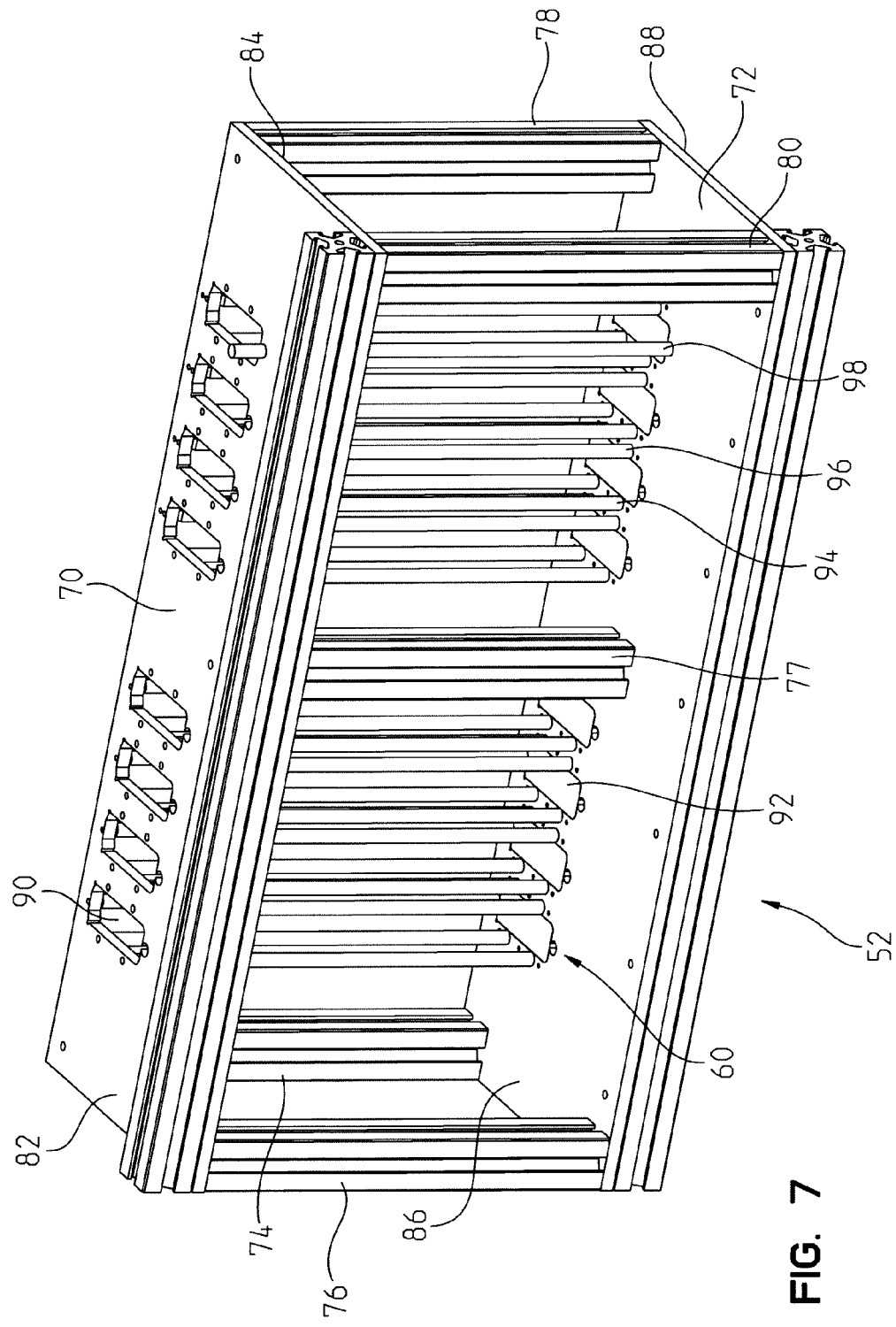
FIG. 7 is a perspective view of a label magazine.

As shown in FIG. 7, the illustrated label magazine 52 has eight label storage stations 60 spaced along the length of the bottom plate 72 between the ends 86, 88 of the bottom plate 72. The top plate 70 has eight label insertion areas 90 that are correspondingly spaced along the length of the top plate 70 between the ends 82, 84 of the top plate 70. Each label insertion area 90 is vertically aligned with one of the label storage stations 60. As illustrated, each label insertion area 90 is a hole, aperture, or open area in the top plate 90, through which labels may be inserted, and each label dispensing area 92 is a hole, aperture or open area in the bottom plate 72, through which labels may be dispensed. Each label insertion area 90 in the top plate 70 and each label dispensing area 92 in the bottom plate 72 is contoured and sized to receive and allow the passage therethrough of the desired product label (e.g. the label 24 or the label 42). Labels fed through the area 90 travel downwardly to the bottom plate 72 by the force of gravity.

A number of vertical bars 94, 96, 98, 100, 102 are arranged around the perimeter of each label storage station 60 to maintain the vertical alignment of the label stacks at each of the label storage stations 60. One of the vertical bars (e.g. the inboard vertical bar 98) is removable to facilitate loading of the labels onto each of the label storage stations 60. When all of the labels have been loaded onto a label station 60, the vertical bar 98 is reinserted into the label magazine 52 (e.g. by inserting each of its ends into corresponding slots in the top and bottom plates 70, 72).

Figure 8:
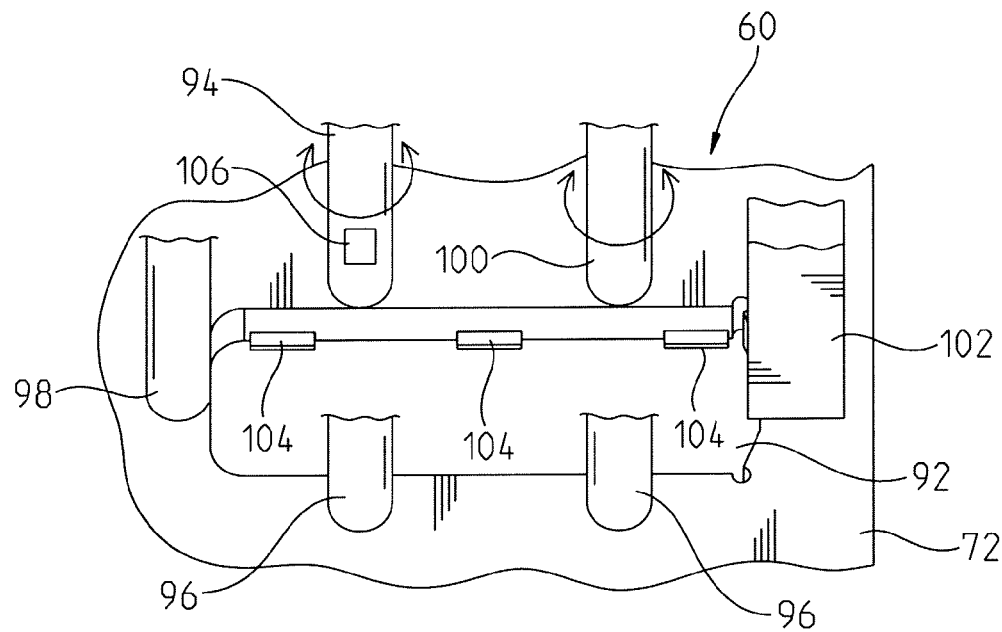
FIG. 8 is a fragmentary perspective view of a label station of the label magazine of FIG. 7.

As shown in FIG. 8, at least two of the vertical bars, 94, 100, are configured to rotate axially in an eccentric manner. One or more of the other bars (e.g., the vertical bar 98) may be similarly configured. Rotation of the bars 94, 100 may be performed manually or may be controlled by the controller 58 (e.g. in response to signals received from a sensor). For example, each of the bars 94, 100 may be configured with an offset tapped hole or similar structure to facilitate manual or automated rotation. Rotation of the bars 94, 100 causes the labels in the label stack to move toward and rest against the fixed bars (e.g. 96, 96) on the opposite side of the label station 60, to maintain the vertical alignment of the label stack.

The label magazine 52 may be equipped with a sensor 106, which senses a change in the amount of labels in the label stack supported by the label station 60 (e.g., by sensing a change in the height of the stack, or a decrease in force or weight applied to the sensor). In one embodiment, the sensor 106 sends a signal to the controller 58 when the height of the label stack goes below a certain threshold value, and then the controller 58 issues a control signal to cause more labels to be fed into the label magazine 52. The controller 58 may be configured to cause a fixed amount of labels to be fed into the label magazine 52 in response to a sensor signal.

In another embodiment, the sensor 106 continuously senses the label height and sends sensor signals to the controller 58. The controller 58 determines whether more labels need to be added to the label stack, and determines how many labels need to be added, to maintain the gravity feed at the label station 60. Then, the controller 58 issues a control signal to an operator or to an automated label feeder (not shown) to cause the appropriate number of labels to be loaded onto the label stack.

If an automated label feeder is used, the feedback loop provided by the sensor 106 automatically sustains the gravity feed, and thus continuous dispensing of the labels from the label magazine 52, without human intervention, until the full label supply is depleted. Alternatively, a mass may be placed onto the label stack that is equivalent to the number of labels needed to sustain the gravity feed of the label magazine 52 until the label magazine 52 is empty. In the illustration, the sensor 106 is mounted to the bar 94, however, it could also be mounted to any of the other bars 96, 98, 100, 102 or to another structure of the label storage location 60.

Each label station 60 of the label magazine 52 has at least one tab 104 extending into the label dispensing area 92 of the bottom plate 72 from the perimeter of the hold 92. The tab or tabs 104 provide a slight interference fit with the bottom-most label in the label stack, thereby controlling the dispensing of the labels from the bottom plate 72.

Figure 9:
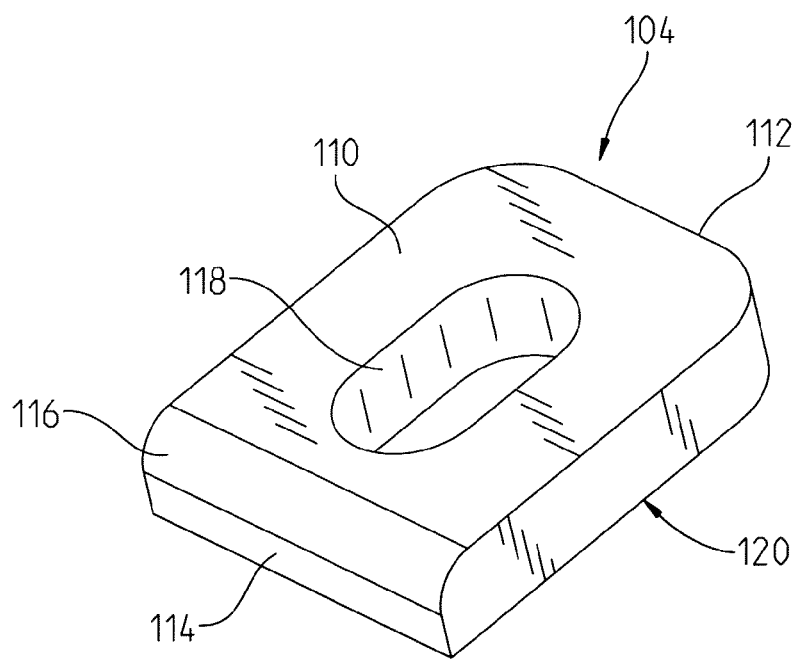
FIG. 9 is a perspective view of a tab of the label station of FIG. 8.

FIG. 9 shows one version of a suitable tab 104. The tab 104 includes a top surface 110, a bottom surface 120 vertically spaced from the top surface 110, an end 112, and an end 114 spaced from the end 112. When installed in the label magazine 52, the top surface 112 faces upwardly toward the label stack. On the end 114, a portion 116 of the top surface 112 is curved, rounded, or tapered. The configuration of the portion 116 may facilitate passage of the labels out of the label station 60.

The tab 104 has a hollow interior region 118, which enables the tab 104 to be secured to the bottom plate 72 of the label magazine 52 by a screw or other suitable fastener (not shown). The elongated or oblong shape of the interior region 118 of the tab 104 allows the position of the tab 104 to be adjusted relative to the area 92. For example, if the fastener is loosened, the tab 104 can slide relative to the fastener either further into the area 92 or further away from the area 92, as may be needed to provide a suitable interference fit for a particular label design.

In other versions, the tab 104 is fixed (i.e. non-adjustable) relative to the label magazine 52. For example, in one version, the tab 104 is integral with (e.g. machined in) the bottom plate 72 of the label magazine 52.

Figure 10:
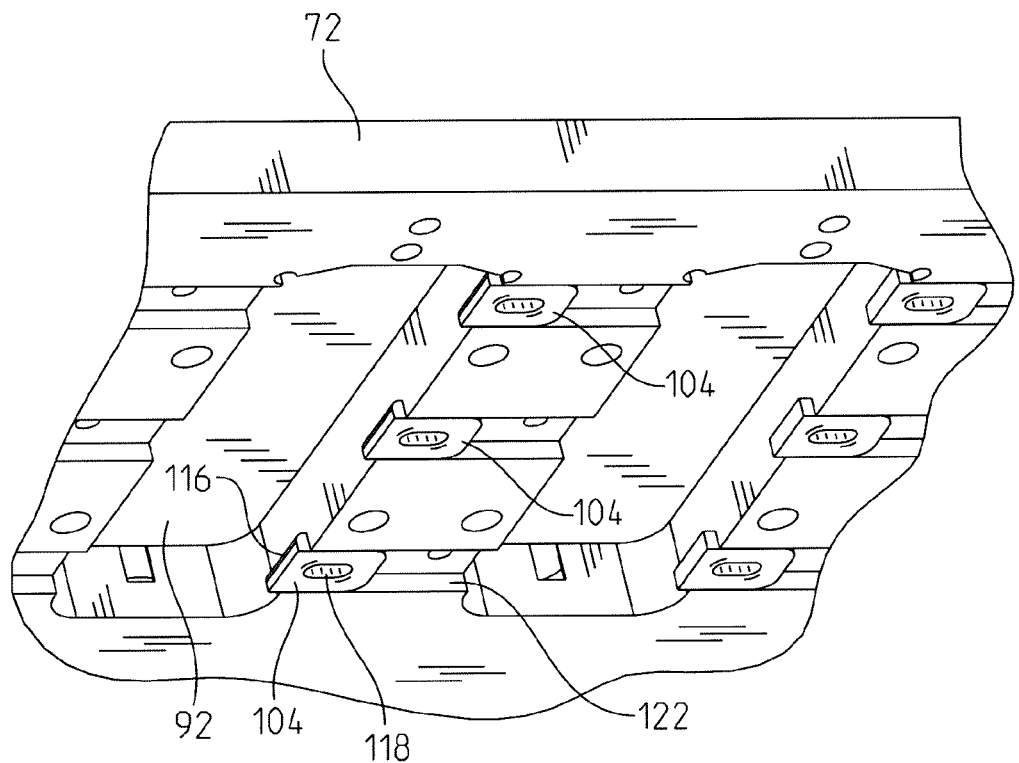
FIG. 10 is a perspective view of a bottom plate of a label magazine, showing tabs installed therein.

FIG. 10 illustrates the tabs 104 installed in tracks 122 in the bottom plate 72 to achieve one possible position of the rounded portions 116 relative to the area 92. In the illustrated version, each label storage station 60 has three tabs 104 mounted on each side of the label dispensing area 92 (for a total of six tabs per area 92). However, a fewer or greater number of tabs 104 may be used at each label storage station 60. For example, in another version, there are two tabs 104 on each side of the area 92.

The label magazine may be enclosed in a protective enclosure in which humidity, temperature and cleanliness are controlled. Also, anti-static bars and/or brushes, de-ionized air baths, or the like, may be used to control static charge at the label magazine.

Figure 11:
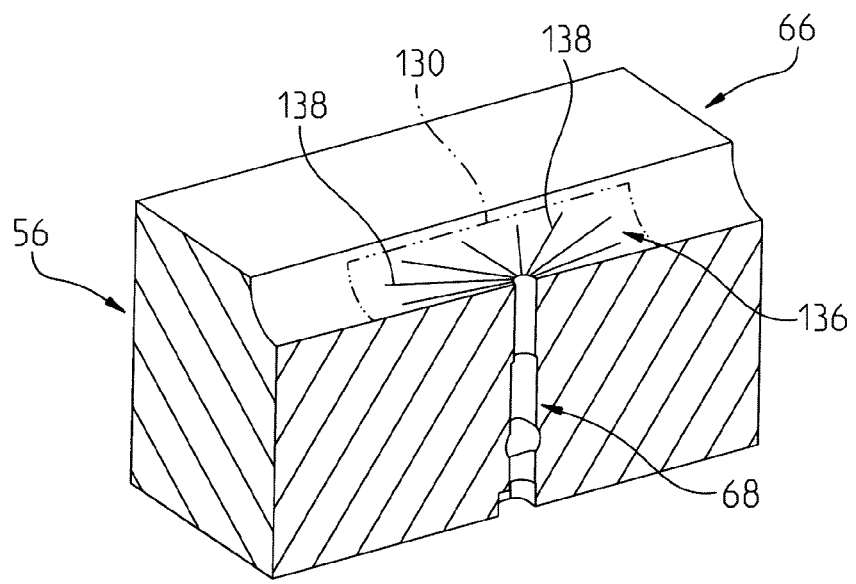
FIG. 11 is a fragmentary schematic view of a label target area in a mold cavity.

FIGS. 11-13 illustrate additional aspects relating to the mold cavity 66. As noted above, each mold cavity 66 of the mold 56 has a suction port 68 in the target area 130. In some embodiments, the suction port 68 is located nearer to the injection gate, e.g. to maintain the position of the leading edge of the label in the target area as the molding material enters the mold cavity. In other words, if the target area 130 is considered as having a pair of spaced-apart ends, with one of the ends of the target area being closer to the injection gate and the other end being located further away from the injection gate, the suction port 68 may be located at the end of the target area 130 that is closer to the injection gate. In other embodiments, the suction port 68 may be centrally located or located nearer to the end of the target area that is further away from the injection gate.

In the version of FIGS. 11-13, the suction port 68 has a pin (e.g. 140, 160) in the suction port 68. The pin 140, 160 is centered in the suction port 68. In one version, the pin 140, 160 is fixed relative to the suction port 68, while in other versions, the pin 140, 160 is movable relative to the suction port 68. In some versions, such as the version shown in FIG. 13, the pin 140, 160 is axially movable relative to a seat having a geometry configured to mate with a portion of the pin.

In versions having a movable pin, the pin 140, 160 is controllable to move into and out of the port 68 to control airflow through the port. The pin 140, 160 moves out of the port 68 (e.g. into the mold cavity) to open a path for air to flow around its circumference to create suction. The pin 140, 160 moves into the port 68 to close the port 68 and deactivate the suction.

In movable-pin versions, the top surface of the pin is generally flush with the surface of the mold cavity 66 when the port 68 is closed by the pin 140, 160. In fixed-pin versions, the top surface (i.e. the proximal end) of the pin 140, 160 is generally flush with the surface of the mold cavity 66 when the pin 140, 160 is in its fixed position. In either case, the diameter of the top surface of the pin 140, 160, facing into the mold cavity, approaches the diameter of the port 68 to provide a small amount of clearance therebetween. In general, the pin is configured to maximize airflow through the suction port yet minimize the flow of injected material from the mold cavity 66 into the port 68.

The top end of the pin 140, 160 thereby supports the label during the injection of resin material. The support provided by the pin 140, 160 helps prevent dimpling or other irregularities in the label that may be caused by the force of the injection. Also, the configuration of the top end of the pin 140, 160 helps prevent resin material from entering the suction port 68 during the injection of resin material into the mold cavity. As a result, there may be no need to flush or purge the suction port 68 of excess resin material after the injection, as is commonly needed in existing systems. Thus, the pin 140, 160 may help to eliminate a step of the in-mold labeling process and shorten the time required to complete the in-mold labeling process.

A couple of examples of suitable geometries for the pins 140, 160 are illustrated in FIGS. 12A-12H and FIG. 13. While specific geometries are shown (e.g. circular, triangular, or D-shaped sections), the particular shape of the pin or any of the pin sections is not important as long as the design requirements are met for centering the pin in the suction port, and maximizing airflow through the suction port while minimizing the flow of injected material into the suction port.

The clearance between the pin and the side of the suction port is sufficient to create a vacuum, where the vacuum pressure is sufficient to maintain the position of the label (and particularly, the leading edge of the label closest to the injection gate) in the target area 130. The clearance is also sufficient to allow airflow through the suction port in the reverse direction, i.e., into the mold cavity, for the purpose of cleaning any injected material out of the port. In some embodiments, this clearance is in the range of about 0.005 to about 0.010 inches between the side of the cavity and the edges of the pin. However, the amount of clearance may vary according to the requirements of a particular design and/or the particular molding material used.

As shown in FIGS. 12A-12G, the amount of clearance may vary at different points along the length of the pin. For example, the clearance 143 (i.e., the proximal end of the pin) may be nearer to 0.005 inches while the clearance 145 and/or 149 (i.e., at the distal end of the pin) may be nearer to 0.10 inches.

One example of a suitable pin 140 is shown in FIGS. 12A-12H. The pin 140 has an end 142 (i.e., a proximal end) and another end 144 (i.e., a distal end) spaced from and axially with the end 142. In between the ends 142, 144, there are a number of sections 146, 148, 152, 154, 156 that are axially aligned. The end 144 has a circular cross section and a generally cylindrical shape. A top surface of a body portion 156 supports the end 144, in that a longitudinal axis of the end 144 is perpendicular to the top surface of the body portion 156. The body portion 156 has a smaller diameter than the end 144.

Figure 12B:
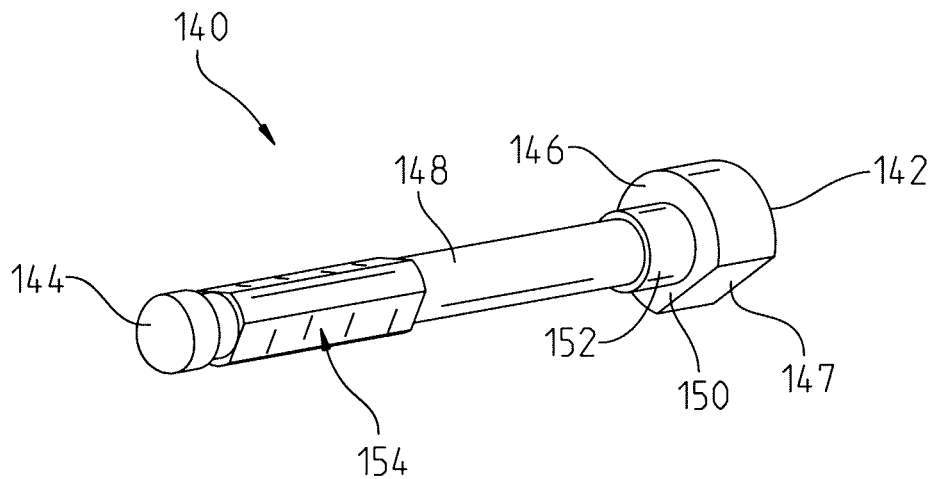
FIG. 12B is another perspective view of the pin of FIG. 12A.
Figure 12C:
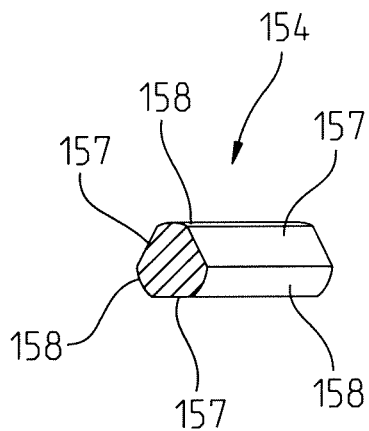
FIG. 12C is a fragmentary perspective view of a portion of the pin of FIGS. 12A and 12B.
Figure 12D:
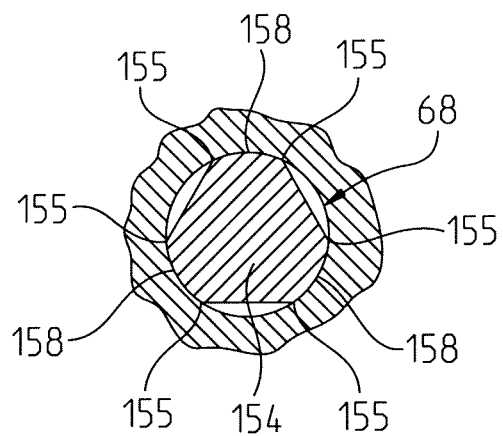
FIG. 12D is a lateral sectional view of the portion of the pin of FIG. 12C located in a suction port.
Figure 12E:
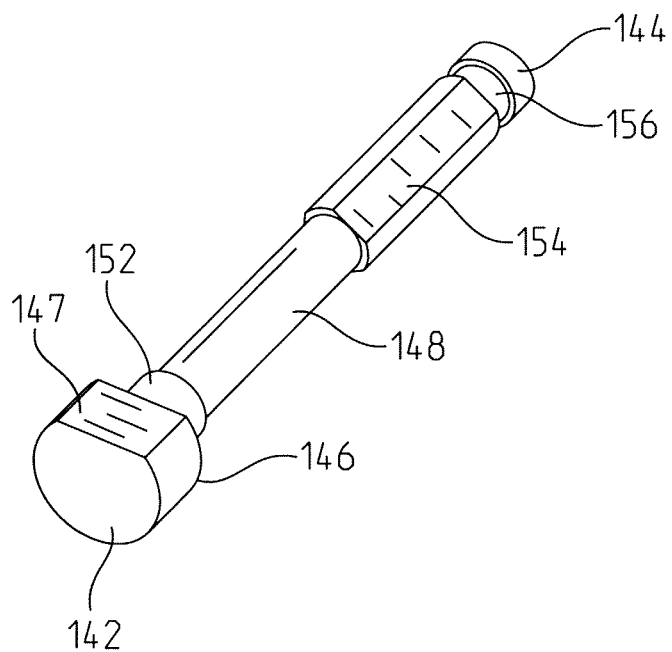
FIG. 12E is another perspective view of the pin of FIGS. 12A-12D.
Figure 12F:
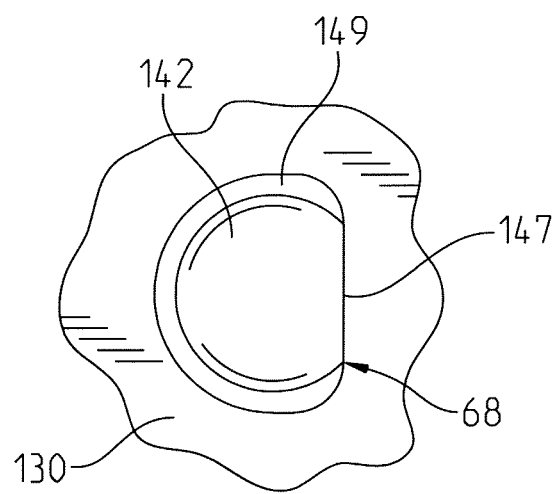
FIG. 12F is a lateral sectional view of the distal end of the pin of FIGS. 12A-12E, positioned adjacent the underside of the mold block.

Another body portion 154 supports the body portion 156 of the pin 140 in a similar fashion. The body portion 154 has a modified triangularly shaped cross section as shown in FIGS. 12C and 12D. In the illustrated version, the cross section of the body portion 154 is similar to an equilateral triangle with the corners of the triangle removed. However, any suitable shape may be used, as long as the pin has spaced-apart edges or surfaces that contact the interior of the suction port in such a way that the pin is centered in the port.

In the embodiment illustrated in FIGS. 12A-12H, the body portion 154 has three sides 157, and three sides 158, where each side 157 opposes one of the sides 158. In the illustrated version, the width of each of the sides 157 is larger than the width of its opposing side 158. Each of the sides 157 has about the same width and length as the other sides 157, and each of the sides 158 has about the same width and length as the other sides 158. The sides 157 each lie in a plane that intersects the plane of another of the sides 157 at an angle of less than ninety degrees. The width of the sides 158 is larger than the diameter of the body portion 156, so that the sides 158 extend outwardly away from the body portion 156.

Each of the sides 158 has one or more spaced-apart contact points 155 that engage (either slidingly or fixedly, in different versions of the pin) an interior surface of the port 68, such that the pin 140 is centered in the port, as shown in FIG. 12D. While FIG. 12D shows a number of contact points 155, a smaller or greater number of contact points 155 may be used. For instance, the body portion 154 may have a fully triangular cross section, so that there are only three contact points 155 that engage the interior surface of the suction port 68. In any case, the contact points 155 may be arranged diametrically, circumferentially, or in any manner required by a given design to center the pin in the desired suction port while maximizing airflow through the port but minimizing the flow of injected material into the port.

The body portion 154 is supported by a substantially cylindrical body portion 148. The body portion 148 has a diameter that is about the same as, or less than, the diameter of the body portion 156. The body portion 148 is supported by a top surface of a body portion 152, such that a longitudinal axis of the body portion 148 is perpendicular to the top surface of the body portion 152. The illustrated body portion 152 has a circular or modified circular cross-section, however, as noted above, the particular shape of the body portion is not important as long as the design requirements are met.

The body portion 152 is supported by a top surface of a body portion 146, such that a longitudinal axis of the body portion 152 is perpendicular to the top surface of the body portion 146. The body portion 152 is wider (e.g. has a larger diameter) than the body portion 148, and the body portion 146 is wider than the body portion 152. The body portion 146 has a circular, modified circular or D-shaped cross section, however, as noted above, the particular shape of the body portion may be modified according to the requirements of a particular design.

The top surface of the end 144 faces the interior of the mold cavity 66. The end 142 is adjacent to the bottom of the mold 56. The body portion 146 is wider (e.g. has a larger width or diameter) than the remainder of the pin 140. The body portion 146 also has an edge or surface 147 that is straight relative to the rest of the body portion 146. The shape of the body portion 146 is designed to aid in centrally locating the end 142 in the suction port 68, to provide greater airflow clearance (e.g. through a channel 149) or for other reasons. Other portions of the pin 140 may, alternatively or in addition, aid with the central alignment of the pin in the suction port 68. For example, the sides 158 of the body portion 154 may engage the inner side wall of the suction port 68, thereby acting as locating points for the pin 140.

In configurations where the pin 140 is movable, the pin 140 is positioned so that during injection, the pin 140 moves into the suction port 68, so that the end 142 is flush with the surface of the mold cavity 66. In this way, the pin 140 deactivates the suction port 68 by preventing airflow through the port, while supporting the label against the injection pressure.

In the absence of injection pressure, the end 144 of the pin 140 is disposed slightly into the mold cavity 66. This allows air to flow around the end 144 and into the suction port 68. The suction action is used to maintain proper placement of the label in the mold cavity 66.

A picture of the pin 140 is shown in FIG. A6 of U.S. Provisional Patent Application Ser. No. 61/293,912. The illustrated version of the pin 140 is a movable pin having one position in which the suction port is open and another position in which the suction port is closed. As such, the locating points (e.g. the sides 158) of the pin are in sliding engagement with an inner wall or walls of the suction port 68. Other versions of the pin 140 are fixed in the suction portion 68 (i.e. not axially movable relative to the suction port). In fixed versions of the pin 140, the end 144 is generally flush with the surface of the mold cavity 66.

Figure 12G:
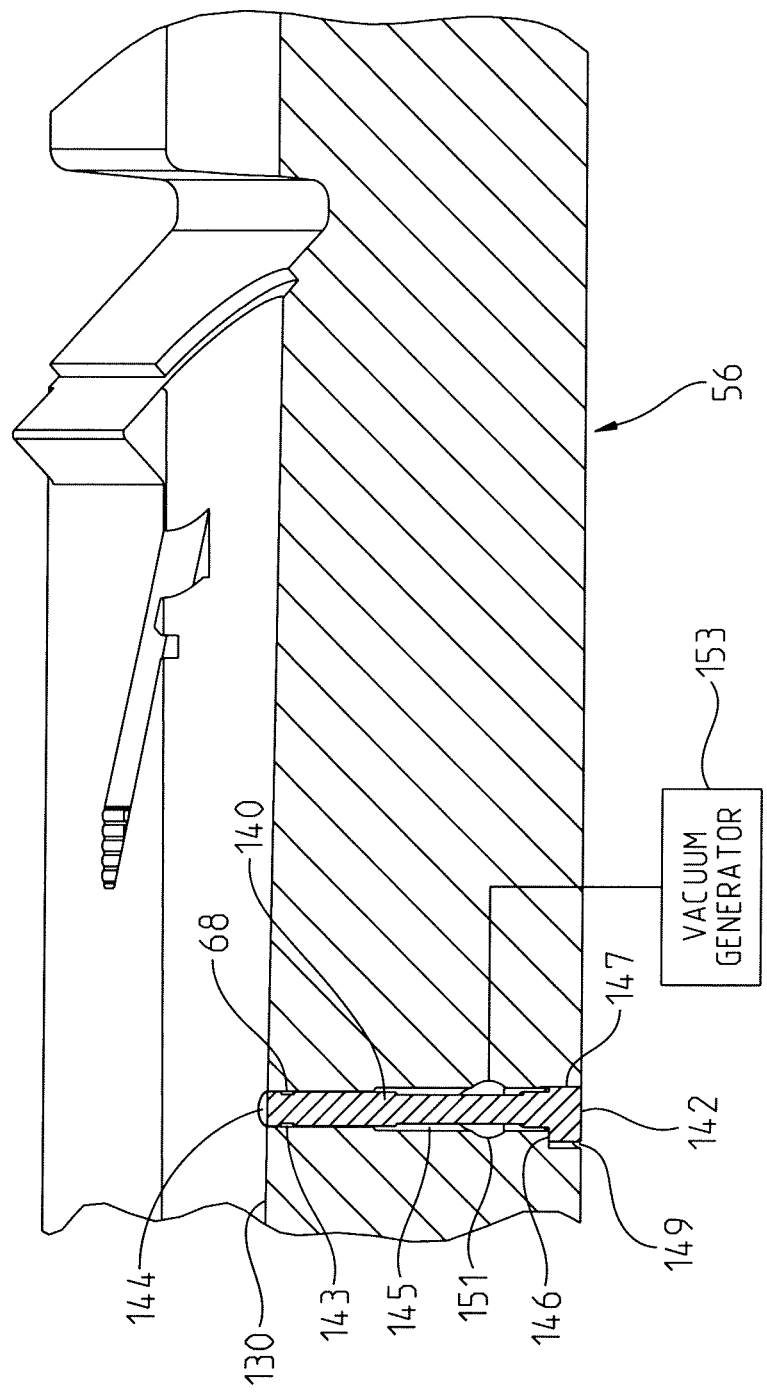
FIG. 12G is a longitudinal sectional view of the pin of FIGS. 12A-12F located in a mold for an injection-molded product.
Figure 12H:
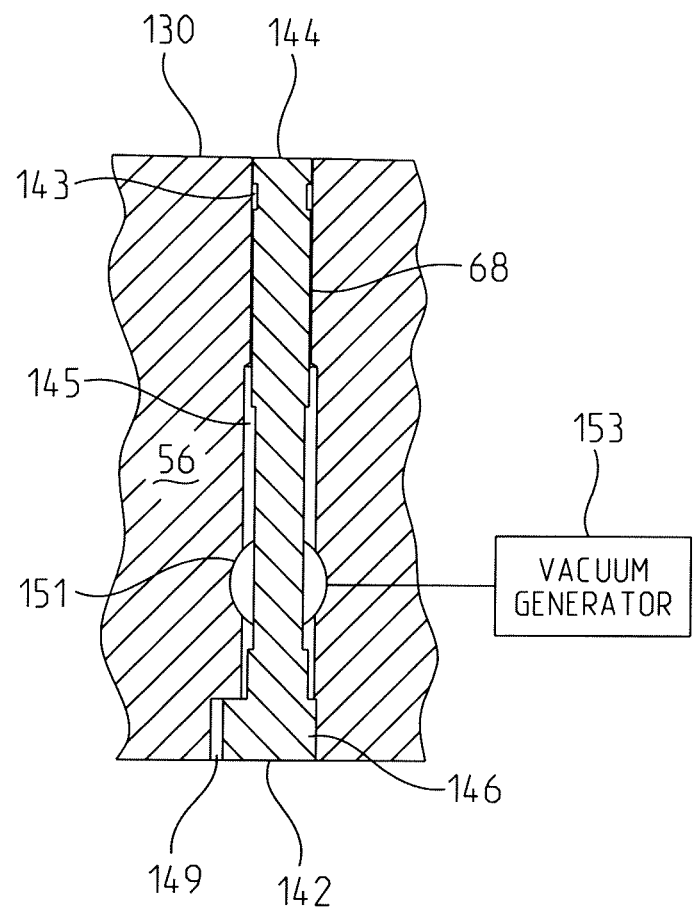
FIG. 12H is a longitudinal sectional view of the pin of FIGS. 12A-12F located in a suction port of the mold of FIG. 12G.

FIG. 12G shows one version of the pin 140 positioned in a suction port 68 of a mold cavity 66 of a mold for a product of the type shown in FIG. 4. FIG. 12H shows a more detailed sectional view of the pin 140 in a suction port of a mold cavity. A vacuum generator 153 supplies negative pressure to create suction in the port 68. In the drawings, the vacuum generator 153 is shown connected to a vacuum channel 151, which intersects the port 68 from the side. However, the vacuum generator 153 may be connected at the bottom of the port (e.g. adjacent the surface 142) or in any other suitable fashion. There are many types of vacuum generators that are commercially available, and the vacuum generator 153 may be of any suitable type as will be understood by those skilled in the art. In some versions, the vacuum channel 151 may connect multiple ports 68 (e.g. the suction ports of multiple mold cavities) to the vacuum generator 153.

FIG. 12G-12H also illustrates the difference in size (e.g. clearance) between the air channel 143 and the air channels 145, 149. The air channels 145, 149 are larger than the air channel 143. This allows a greater volume of airflow through the channels 145, 149 than through the channel 143. In other versions, one or more of the air channels 143, 145, 149 may be the same size.

Another example of a suitable pin 160 is shown in FIG. 13. The pin 160 operates similarly to the pin 140, in that in the absence of injection pressure, the pin head 166 is disposed slightly into the mold cavity to allow suction pressure to flow through the suction port 68. However, the pin head 166 has a tapered surface 170, which contacts a similarly tapered seat of the suction port 68 when injection pressure is applied to the mold cavity, thereby shutting off the suction action. The larger surface area of the pin head 166 (relative to the pin head 146) may provide additional support for the label against the injection pressure.

In general, the pins 140, 160 are made of a metal, such as aluminum or steel. In the illustrated apparatus and methods, the injection pressure in the mold cavity is in the range of about 3,000 psi to about 20,000 psi. In one example, the injection pressure in the mold cavity is in the range of about 15,000 psi to about 20,000 psi.

Returning to FIG. 11, in some versions, a portion 136 of the target area 130 of the mold cavity 66 has a textured surface. In some versions, the "texture" is provided by one or more shallow tracks 138 that are machined into the cavity surface at the target area 130. The tracks 138 generally intersect with the suction port 68. The depth of the tracks 138 is sufficient to allow air to be drawn from the tracks into the suction port 68 when suction is turned on. For example, the track or tracks 138 may be 0.003 inches deep. In general, the tracks 138 extend outwardly from the port 68 toward the edges of the target area 130. However, other configurations may be used to address particular design requirements regarding the portion or amount of the surface area of the mold cavity under the label that is to be exposed to the suction action provided by the suction port 68.

There are many advantages of the present disclosure arising from the various features described herein. It will be noted that alternative embodiments of the present disclosure may not include all of the features described yet still benefit from at least some of the advantages of such features. Those of ordinary skill in the art may readily devise their own implementations that incorporate one or more of the disclosed features and fall within the spirit and scope of this disclosure as defined by the appended claims.

The invention claimed is:

1. An apparatus for in-mold labeling an injection-molded product, comprising
 a label magazine comprising a plurality of label storage stations,
 a handling tool configured to handle a plurality of labels, and
 a mold having a plurality of mold cavities, the mold being configured to receive injected material to create an injection-molded product, wherein the handling tool is configured to remove a plurality of labels from the magazine, and to position each of the labels in a target area in one of the mold cavities, and each of the target areas of the mold cavities comprises a suction port located along a longitudinal length of the mold cavity, wherein the suction port has a pin disposed therein, and the pin comprises an end, a first body portion and a second body portion, the end, the first body portion and the second body portion are axially aligned, at least two of the end, the first body portion, and the second body portion each have a differently-shaped cross-section, the second body portion has a modified triangularly shaped cross section and modified corners of the triangularly shaped cross section contact the interior of the suction port to center the pin in the port, and the pin is positioned in the suction port so that the end is disposed in the mold cavity during at least a portion of the injection-molding process.

2. The apparatus of claim 1, wherein each label storage station of the label magazine has a perimeter, a number of vertically extending bars are disposed around the perimeter of the label storage station to define a label stacking column, at least one of the vertically extending bars is axially rotatable, and another of the vertically extending bars is non-rotatable.

3. The apparatus of claim 2, wherein each label storage station includes a label dispensing aperture and a tab extending at least partially into the label dispensing area.

4. The apparatus of claim 3, wherein the tab has an upwardly facing rounded surface configured to at least temporarily engage a surface of a label.

5. The apparatus of claim 4, wherein the position of the tab is adjustable relative to the label dispensing aperture.

6. The apparatus of claim 5, comprising a sensing device coupled to the label dispensing aperture.

7. An apparatus for in-mold labeling an injection-molded product, comprising
 a label magazine comprising a plurality of label storage stations,
 a handling tool configured to handle a plurality of labels, and
 a mold having a plurality of mold cavities, each mold cavity being configured to receive material forced into the mold cavity by injection to create an injection-molded product, wherein the handling tool is configured to remove multiple labels from the magazine, and position each of the removed labels in a target area located along a longitudinal length of one of the mold cavities, and the target area is configured to maintain the position of each of the labels in the mold cavities during the injection of material into the mold cavity, wherein each target area has a suction port disposed therein, the suction port has a pin disposed therein, the pin comprises an end and a plurality of body portions each having a different cross-section, and one of the body portions has a modified triangularly shaped cross section and modified corners of the triangularly shaped cross section contact the interior of the suction port to center the pin in the suction port.

8. The apparatus of claim 7, wherein the pin has a first position in which the suction port is open and a second position spaced from the first position, in which the suction port is closed.

9. The apparatus of claim 8, wherein a head of the pin supports the label when the pin is in the second position.

10. The apparatus of claim 9, wherein the head of the pin is at least partially in the mold cavity when the pin is in the first position.

11. The apparatus of claim 7, wherein the target area has a textured surface.

12. The apparatus of claim 7, comprising a plurality of tracks in the target area and intersecting the suction port.

13. The apparatus of claim 1, wherein the end of the pin is not substantially flush with any surface of the mold cavity during at least a portion of the injection-molding process.

14. The apparatus of claim 1, wherein the differently-shaped cross sections of the first and second body portions cooperate with the suction port to define varying amounts of clearance between the pin and a side of the suction port along the length of the pin.

15. The apparatus of claim 14, wherein the first and second body portions cooperate with the suction port to define a first amount of clearance near a proximal end of the pin and a second amount of clearance near a distal end of the pin, and wherein the first amount of clearance is smaller than the second amount of clearance.

\* \* \* \* \*